(12) United States Patent
Horen et al.

(10) Patent No.: US 9,832,492 B2
(45) Date of Patent: Nov. 28, 2017

(54) DISTRIBUTION OF ADAPTIVE BIT RATE VIDEO STREAMING VIA HYPER-TEXT TRANSFER PROTOCOL

(71) Applicant: Espial Group Inc., Ontario (CA)

(72) Inventors: Robert S. Horen, Pleasanton, CA (US); Eivind Sarto, Oakland, CA (US); Khai Truong, San Jose, CA (US)

(73) Assignee: Espial Group Inc., Ontario (CA)

( * ) Notice: Subject to any disclaimer, the term of this patent is extended or adjusted under 35 U.S.C. 154(b) by 13 days.

(21) Appl. No.: 14/822,805

(22) Filed: Aug. 10, 2015

(65) Prior Publication Data

US 2015/0350704 A1    Dec. 3, 2015

Related U.S. Application Data

(63) Continuation-in-part of application No. 13/753,051, filed on Jan. 29, 2013, now Pat. No. 9,106,934.

(51) Int. Cl.
  *H04N 21/218* (2011.01)
  *H04N 21/239* (2011.01)
  (Continued)

(52) U.S. Cl.
  CPC ... *H04N 21/2181* (2013.01); *G06F 17/30017* (2013.01); *H04L 65/4084* (2013.01);
  (Continued)

(58) Field of Classification Search
  CPC .......... G06F 17/30017; H04N 21/2381; H04N 21/222; H04N 21/2181; H04N 21/23439;
  (Continued)

(56) References Cited

U.S. PATENT DOCUMENTS 9,106,934 B2    8/2015 Horen et al.
2002/0010798 A1    1/2002 Ben-Shaul et al.
(Continued)

FOREIGN PATENT DOCUMENTS

EP    2547062 A1    1/2013
WO    2004/056057 A2    7/2004
(Continued)

OTHER PUBLICATIONS

PCT International Search Report dated Apr. 16, 2014 for Appln. No. PCT/CA2014/000054.
(Continued)

*Primary Examiner* — Benjamin R. Bruckart
*Assistant Examiner* — Jen-Shi Huang
(74) *Attorney, Agent, or Firm* — Carter, DeLuca, Farrell & Schmidt, LLP; George Likourezos, Esq.

(57) ABSTRACT

A system, method and apparatus of distributing a video stream is provided. At a publishing point relay, a plurality of video files encoded from a portion of the video stream from a Hypertext Transfer Protocol (HTTP) Adaptive Bit Rate (ABR) video encoding device are received. Each of the encoded video files having a different bit-rate, the encoded video files received using a protocol for transferring files. Edge publishing point servers are determined that are registered with the publishing point relay to distribute the audio/video stream. Each of the encoded video files received by the publishing point relay are relayed to each of the determined edge publishing points as each video file is received from the HTTP ABR video encoding device.

22 Claims, 5 Drawing Sheets

(51) Int. Cl.

| | | |
|---|---|---|
| *H04N 21/2381* | (2011.01) | |
| *H04N 21/643* | (2011.01) | |
| *H04N 21/222* | (2011.01) | |
| *H04N 21/2343* | (2011.01) | |
| *H04N 21/647* | (2011.01) | |
| *G06F 17/30* | (2006.01) | |
| *H04L 29/06* | (2006.01) | |
| *H04L 29/08* | (2006.01) | |

(52) U.S. Cl.
CPC .......... *H04L 65/602* (2013.01); *H04L 65/608* (2013.01); *H04L 65/80* (2013.01); *H04L 67/02* (2013.01); *H04L 67/2842* (2013.01); *H04N 21/222* (2013.01); *H04N 21/2381* (2013.01); *H04N 21/2393* (2013.01); *H04N 21/23439* (2013.01); *H04N 21/64322* (2013.01); *H04N 21/64707* (2013.01)

(58) Field of Classification Search
CPC ............... H04L 65/608; H04L 67/2842; H04L 65/4084; H04L 67/02
See application file for complete search history.

(56) References Cited

U.S. PATENT DOCUMENTS

| | | |
|---|---|---|
| 2007/0089145 A1 | 4/2007 | Medford et al. |
| 2007/0233889 A1 | 10/2007 | Guo et al. |
| 2008/0071859 A1 | 3/2008 | Seed et al. |
| 2009/0220216 A1 | 9/2009 | Marsh et al. |
| 2010/0235528 A1 | 9/2010 | Bocharov et al. |
| 2010/0235542 A1 | 9/2010 | Visharam et al. |
| 2011/0202596 A1 | 8/2011 | Gokurakuji |
| 2011/0302320 A1 | 12/2011 | Dunstan et al. |
| 2012/0002717 A1 | 1/2012 | Ma et al. |
| 2012/0042090 A1* | 2/2012 | Chen ..................... H04L 65/607 709/231 |
| 2012/0042091 A1 | 2/2012 | McCarthy et al. |
| 2012/0192230 A1* | 7/2012 | Algie ............. H04N 21/234309 725/38 |
| 2012/0195362 A1 | 8/2012 | Benno et al. |
| 2012/0254456 A1 | 10/2012 | Visharam et al. |
| 2012/0259946 A1* | 10/2012 | Stockhammer ....... H04L 65/105 709/217 |
| 2012/0317291 A1 | 12/2012 | Wolfe |
| 2013/0054728 A1* | 2/2013 | Amir ................... H04N 21/2183 709/213 |
| 2013/0262693 A1 | 10/2013 | Phillips et al. |
| 2013/0308699 A1 | 11/2013 | Musser, Jr. et al. |

FOREIGN PATENT DOCUMENTS

| | | |
|---|---|---|
| WO | 2011044285 A2 | 4/2011 |
| WO | 2011/086350 A1 | 7/2011 |
| WO | 2012074777 A1 | 6/2012 |

OTHER PUBLICATIONS

Extended European Search Report for EP 14 74 5579 dated Jul. 28, 2016.

* cited by examiner

DISTRIBUTION OF ADAPTIVE BIT RATE VIDEO STREAMING VIA HYPER-TEXT TRANSFER PROTOCOL

CROSS-REFERENCE TO RELATED APPLICATIONS

This application is a continuation-in-part of U.S. patent application Ser. No. 13/753,051 filed Jan. 29, 2013 the entirety is hereby incorporated by reference for all purposes.

TECHNICAL FIELD

The current description relates to the distribution of video via Hypertext Transfer Protocol (HTTP), and in particular to scalable distribution of HTTP-based adaptive bit rate (ABR) video streaming for HTTP ABR video encoders.

BACKGROUND

For optimal viewing experience, streaming video over a network should take into account the prevailing network conditions to provide the optimal viewing experience by dynamically adjusting to changes in network throughput that impact streaming video performance. An HTTP video encoder encodes a video into a plurality of different bit-rates or streams, with each encoding being segmented into a set of small video files. Typically each video file is a 2 to 10 second in duration. Each output video stream from an ABR video encoder will be encoded at a number of bit-rates, for example into a low (64 kb/s), medium (640 kb/s) and high bandwidth (3000 kb/s) encoding, each of which is segmented into files of a predetermined length, for example 10 second long video segments per file. A client may stream the video by requesting the first file of the appropriate bit-rate depending upon the prevailing or estimated network conditions. Once the requested video file is received, it is played and the next video segment requested.

FIG. 1 depicts an illustrative prior art system for streaming video over a network using Hypertext Transfer Protocol (HTTP) in a content distribution network (CDN). The system 100 receives a video stream 102, at an encoder 104. The encoder 104 receives the video stream 102 and encodes the video stream into a plurality of individual video segment files of different bit-rates. As depicted in FIG. 1, the encoder 104 produces a plurality of bit-rate encodings 106*a*, 106*b*, 106*c* (referred to collectively as bit-rate encodings 106) of the video. As depicted, each bit-rate encoding is segmented into a number of individual files, depicted by the individual boxes of the bit-rate encodings 106. Each individual file represents a particular segment of the video. The segment duration of each individual file is identical across all encoded bit rates enabling an HTTP client to easily switch to a different bit-rate encoding in response to a change in network conditions.

Typically video encoder 104 can only output the bit-rate encodings 106 to a very limited number of publishing points, for example one or two locations. As the encoder 104 produces each of the individual files for the different bit-rate encodings 106, they are transferred to a distribution network 108. The files of the bit-rate encodings 106 are transferred to one or more publishing points over a distribution network 108 using a transfer protocol, which is typically HTTP, although other protocols for transferring files could be used, such as file transfer protocol (FTP). Additionally or alternatively the files for each bit-rate encoding 106 may be written to an Network File System (NFS) storage device, or other formatted storage drive, that is accessible by one or more publishing points. The distribution network 108 receives HTTP requests, such as an HTTP GET request, from one or more client devices 110, 114, 118 for individual files of the bit-rate encodings. The distribution network 108 then sends the requested file segment to the requesting client. As such, a client device can change the bit-rate of the video being streamed by requesting a file for the video segment of the same time interval which contains the optimum encoded bit rate based on current network conditions as determined by the HTTP client. In FIG. 1, all of the segment files 112 requested by, and returned to, the display device 110 are depicted as the high bit-rate encoding, while all of the segment files 116 requested by, and returned to, the display device 114 are depicted as the low bit-rate encoding. Display device 118 is depicted as requesting and receiving segment files from different bit-rate encodings, as such, the bit-rate of the video displayed on the device 118 will vary. Although depicted as a single server, it will be appreciated that the distribution network 108 may be provided by a plurality of servers that co-operate to respond to HTTP requests. As will be appreciated, the encoder 104 may transfer the bit-rate encodings 106 to a cache gateway, which receives and responds to HTTP requests from edge caching servers. The edge caching servers in turn may respond to HTTP requests received from display devices. The edge caching servers may cache file segments for a short period of time so that if a further device requests the same segment, it can be provided from its cached version instead of sending an HTTP request to the cache gateway for the segment. A cache gateway may be a bottleneck if it does not have sufficient bandwidth or processing capabilities to respond to all of the HTTP requests received from different edge caching servers. If the cache gateway cannot service all of the requests as required, it may be necessary to add one or more additional cache gateways. Adding additional cache gateways may in turn require one or more additional encoders in order to be able to provide sufficient outputs to the additional cache gateways.

It is desirable to have a system for distributing video via HTTP that does not require additional video encoders to service an increased number of requests for streaming the video.

DETAILED DESCRIPTION

Figure 1:
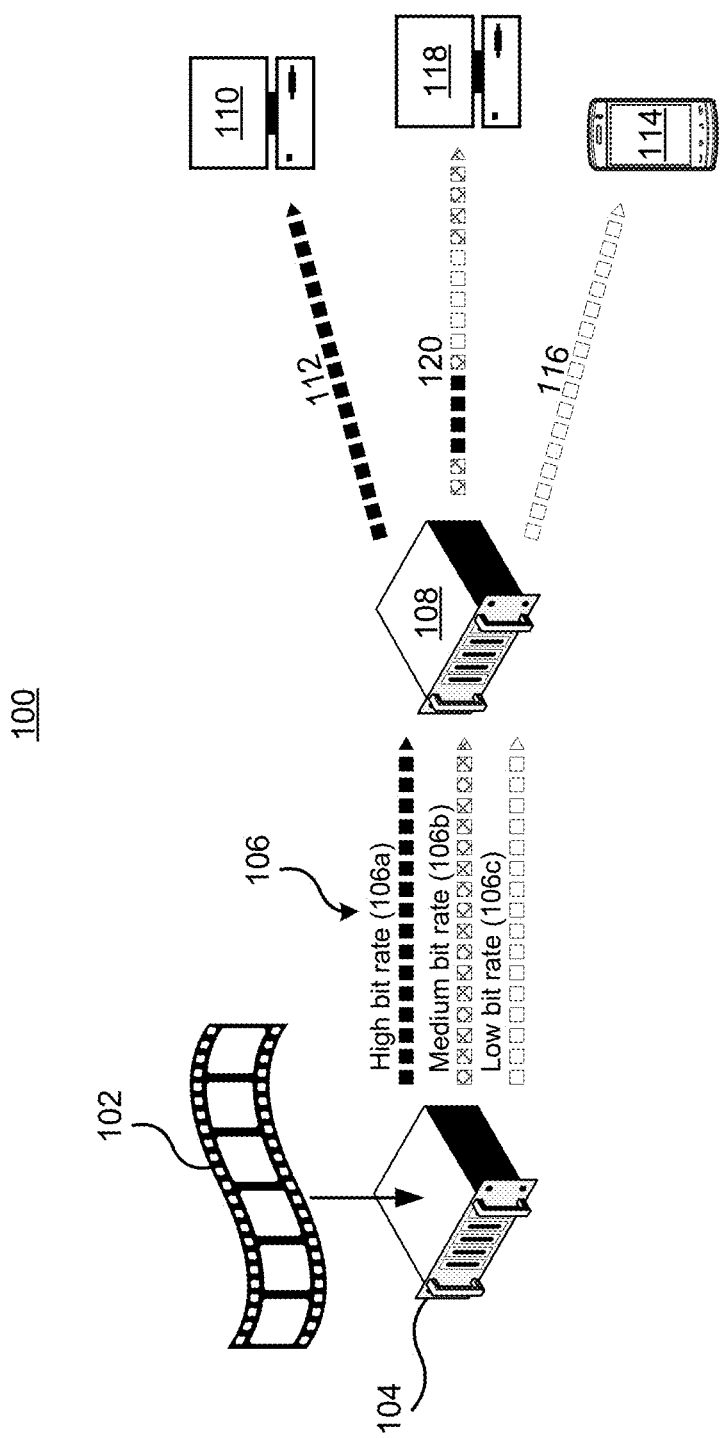
FIG. 1 depicts an illustrative prior art system for streaming video over a network.

In accordance with an aspect there is provided a system for distributing a video stream, the system comprising: a Hypertext Transfer Protocol (HTTP) Adaptive Bit Rate (ABR) video encoding device adapted to: receive a portion of the live video stream from a content source; encode the received portion of the video stream into a plurality of encoded video files, each of the encoded video files having associated with a different bit rate stream; and make each of the plurality of encoded video files available to one or more networked devices using a protocol for transferring files over a network; a publishing point relay adapted to: receive each of the plurality of the encoded video files from the ABR video encoding device and which are accessible to the publishing point relay from a network storage location wherein a sliding window of video files is maintained by deleting older video files from the publishing point relay and each edge publishing point as new video files are received at the network storage location; determine edge publishing points to transfer the encoded video files to, from the publishing point relay, from a list of one or more edge publishing points registered with the publishing point relay wherein the list of edge publishing points can be dynamically updated by removing an edge publishing point from the list when the edge publishing point is non-responsive; and transfer each of the encoded video files received by the publishing point relay to each of the determined edge publishing points as each file is received from the video ABR encoding device; and a plurality of edge publishing points, each adapted to: receive and store the encoded video files transferred from the publishing point relay; receive HTTP GET requests for one of the stored encoded video file from HTTP clients; and transfer the requested encoded video files via HTTP GET responses to the requesting HTTP clients; wherein the ABR video encoding device writes the video files to the network storage location, and wherein the publishing point relay receives each of the plurality of the encoded video files by receiving an indication that the individual video files are available at the a network storage location and retrieves the video files from the network storage location.

In accordance with another aspect there is provided a method of distributing a video stream comprising: receiving, at a publishing point relay, a plurality of video files encoded from a portion of the video stream from a Hypertext Transfer Protocol (HTTP) Adaptive Bit Rate (ABR) video encoding device and which are accessible to the publishing point relay from a network storage location wherein a sliding window of video files is maintained by deleting older video files from the publishing point relay and each edge publishing point as new video files are received at the network storage location, each of the encoded video files having a different bit-rate; determining edge publishing point servers from a list of one or more edge publishing points registered with the publishing point relay to distribute the audio/video stream wherein the list of edge publishing points can be dynamically updated by removing an edge publishing point from the list when the edge publishing point is non-responsive; relaying each of the encoded video files received by the publishing point relay to each of the determined edge publishing points as each video file is received from the ABR encoding device; and providing a plurality of edge publishing points, each adapted to: receive and store the encoded video files transferred from the publishing point relay; receive HTTP GET requests for one of the stored encoded video files from HTTP clients; and transfer the requested encoded video files via HTTP GET responses to the requesting HTTP clients; wherein receiving, at the publishing point relay, the plurality of video files comprises: receiving at the publishing point relay, for each of the plurality of video files, a respective indication that the video file has been written to the network storage location; and retrieving, by the publishing point relay, each of the video files from the network storage location.

In accordance with yet another aspect there is provided an apparatus for use in streaming video, the apparatus comprising: a processor for executing instruction; and a memory for storing instructions, the instructions when executed by the processor configuring the apparatus to: receive each of a plurality of encoded video files from a Hypertext Transfer Protocol (HTTP) Adaptive Bit Rate (ABR) video encoding device and which are accessible to the publishing point relay from a network storage location wherein a sliding window of video files is maintained by deleting older video files from the publishing point relay and each edge publishing point as new video files are received at the network storage location; determine edge publishing points to transfer the encoded video files to, from the publishing point relay, from a list of one or more edge publishing points registered with the publishing point relay wherein the list of edge publishing points can be dynamically updated by removing an edge publishing point from the list when the edge publishing point is non-responsive; and transfer each of the encoded video files received by the publishing point relay to each of the determined edge publishing points as each file is received from the ABR encoding device a plurality of edge publishing points, each adapted to: receive and store the encoded video files transferred from the publishing point relay; receive HTTP GET requests for one of the stored encoded video files from HTTP clients; and transfer the requested encoded video files via HTTP GET responses to the requesting HTTP clients; wherein the ABR encoding device writes the video files to the network storage location, and wherein the publishing point relay receives each of the plurality of the encoded video files by receiving an indication that the individual video files are available at the a network storage location and retrieves the video files from the network storage location.

Encoding and streaming video to a large number of devices without requiring additional encoders is possible as described further herein. An HTTP adaptive bit rate (ABR) encoding device encodes a video stream into a plurality of individual files for different bit-rate encodings. The ABR video encoding may utilizes encoding formats such as HTTP Live Streaming (HLS) from Apple™, Moving Picture Expert Group (MPEG) Dynamic Adaptive Streaming over HTTP (DASH), HTTP Dynamic Streaming (HDS) from Adobe™, Smooth Streaming from Microsoft™ or any ABS video encoding and streaming protocol. The encoding device transfers the files to a publishing point relay, which in turn transfers the received files to a plurality of edge publishing points. The edge publishing points may respond to HTTP requests from devices and provide requested video file segments. The devices that request the video file segments from the edge publishing points may be a client device for displaying the video or a caching edge server, which in turn responds to client device requests. The publishing point relay does not need to respond to HTTP requests as a cache gateway does. Instead the publishing point relay receives video files from the encoding device and then transfers them to a plurality of edge publishing points which store the files and respond to HTTP requests. In addition, this enables the following IPTV services to be implemented on top of the ABR encoder relay in an identical manner to edge device receiving the data directly from the real ABR encoder: Catch Up TV or Network Digital Video Recorder (NDVR) services when on demand video recordings are made available for consumption by multiple users, Remote Storage Digital Video Recorder (RSDVR) or Network Personal Video Recorder (NPVR) when on demand video recordings are restricted to consumption by a single user, and Pause Live TV services when a live TV recording is made available to multiple users in real time during the broadcast time period.

Figure 2:
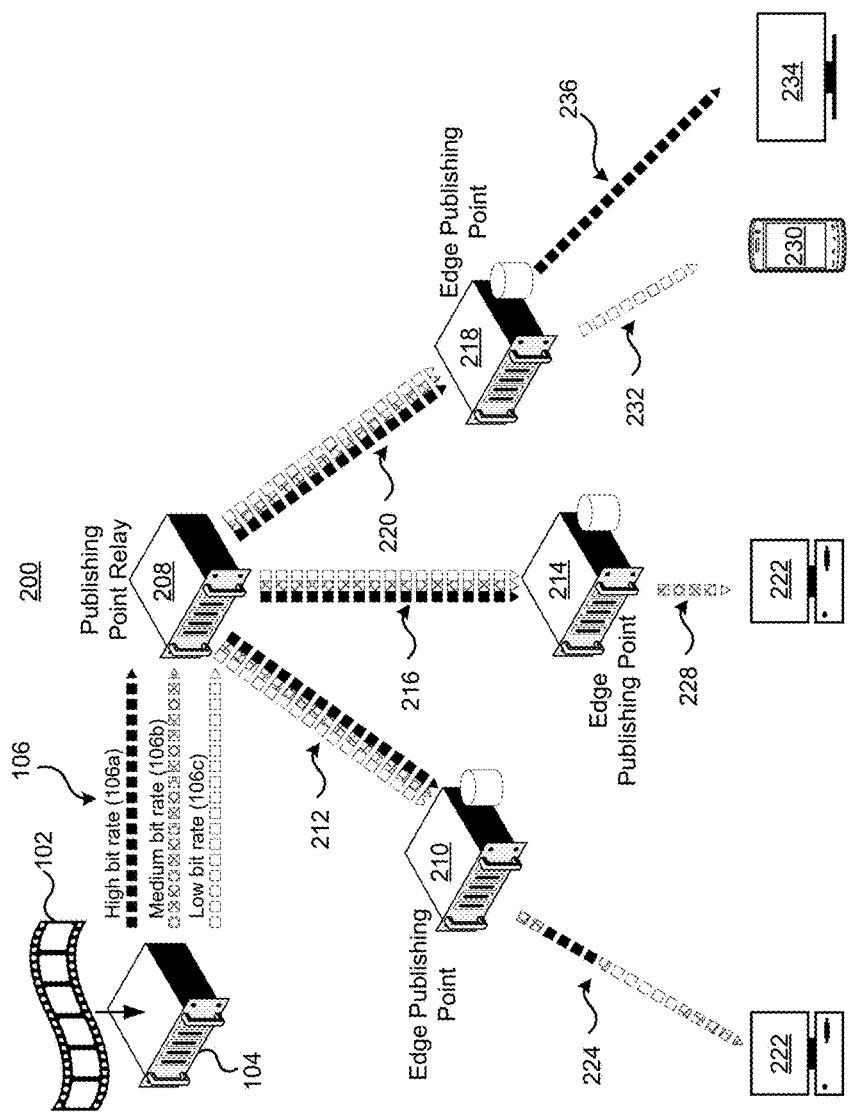
FIG. 2 depicts an illustrative system for distributing live streaming videos over a network.

FIG. 2 depicts an illustrative system for distributing videos over a Content Distribution Network (CDN). The ABR encoder 104 receives an input video stream 102, typically provided as a MPEG-TS Standard Definition (SD) or High Definition (HD) encoding, although the video input 102 may be provided by different encodings.

The ABR encoder 104 receives the video stream 102 and encodes the video stream into a plurality of video segments of different bit-rates. Three different bit-rate encodings 106a, 106b, 106c are depicted, although it is contemplated that the video encoder 104 may produce a larger or smaller number of distinct bit-rate encodings. In FIG. 2, each block in one of the bit-rate encodings 106 is intended to represent a predetermined length of time L such as 10 seconds, although other lengths of time are possible. As such, each block or portion of the video of a set length of time is encoded into a plurality of different individual files each having a different bit-rate. That is the block of the video from time T to time T+L seconds is encoded into a number of different files having different bit-rates. In FIG. 2, each time segment of the video is depicted as being encoded to three different individual file blocks each having different bit-rate encodings.

As the individual files are created by the encoding device 104, they are transferred to a publishing point relay 208 in the CDN. The individual video files may be transferred to the publishing point relay using a protocol for transferring files over a network. For example, in one embodiment, the encoding device 104 may be configured to transfer the files to the publishing point relay using HTTP, in which case the encoding device may use HTTP PUT or HTTP POST commands to write the individual files to the publishing point relay 208. Additionally or alternatively, the encoding device 104 may be configured to write the individual files to an NFS drive, in which case the publishing point may receive a notification that a new file has been written to the drive and so it can retrieve the file from the NFS drive. Regardless of the protocol used to transfer files between the encoding device and the publishing point relay 208, the encoding device will maintain a sliding window of video files on the publishing point relay 208. That is, as the encoding device transfers new video files to the publishing point relay, it deletes older files present at the publishing point relay that fall outside the bounds of the sliding window.

As described further below, when the publishing point relay 208 detects updates for the video encoder sliding window, it automatically propagates the sliding window updates to a plurality of edge publishing points 210, 214, 218 that have been registered with the publishing point relay to receive the video content. That is, as the publishing point relay receives new file or has older files deleted from it, the publishing point relay propagates the changes to the edge publishing points 210, 214 and 218. As depicted in FIG. 2, the publishing point relay 208 will transfer all of the new files for the different bit-rate encodings, that is the publishing point relay transfers the different bit-rate encoding files 212 to edge publishing point 210, transfers the different bit-rate encodings 216 to edge publishing point 214 and transfers the different bit-rate encoding files 220 to edge publishing point 218. The publishing point relay will also propagate the sliding window file deletions to each of the edge publishing points 210, 214, 218. As a result, each edge publishing point 210, 214, 218 maintains the same sliding window as the ABR encoder 104. Each edge publishing point receives the output 106, or a copy of the output, of the ABR encoding device 104 in approximately real time as it is encoded. That is, the publishing point relay 208 receives the encoded files from the encoding device 104 as they are generated, and automatically transfers the received files to each of the edge publishing points as the files are received at the publishing point relay. Similarly, the older files may be deleted from the edge publishing points as they are deleted from the publishing point relays. As such, the encoded video segments are available at the edge publishing points after a minimal delay for transferring the files over the network.

One or more display devices 222, 226, 230, 234 may stream the live encoded video from the edge cache servers by requesting the appropriate file segments. It will be appreciated that the appropriate file segment to request may be based on the time of the video being played, that is the appropriate file segment will have the bit-rate encoding best suited to the prevailing network conditions for the client device making the request. As depicted in FIG. 2, device 222 receives a stream 224 that includes individual video files of different bit-rates over time as network conditions change for device 222. The streaming data 224 is acquired by the client device 222 using HTTP GET requests sent to the edge publishing point 210. Display device 226 is depicted as receiving a stream 228 that started at a later time in the live video stream, e.g. joining the live video stream at a late time, as depicted by the shorter stream length. Each of the files of the video steam 228 are depicted as being from the medium bit-rate encoding. Device 230 requests and receives video stream 232, which is depicted as being a low bit-rate encoding, which may be well suited for a mobile device. Finally, device 234, which is depicted as being a television, or set-top box, and as such may have a wired or high bandwidth connection, receives a video stream comprising files from the high bit-rate encoding.

Figure 3:
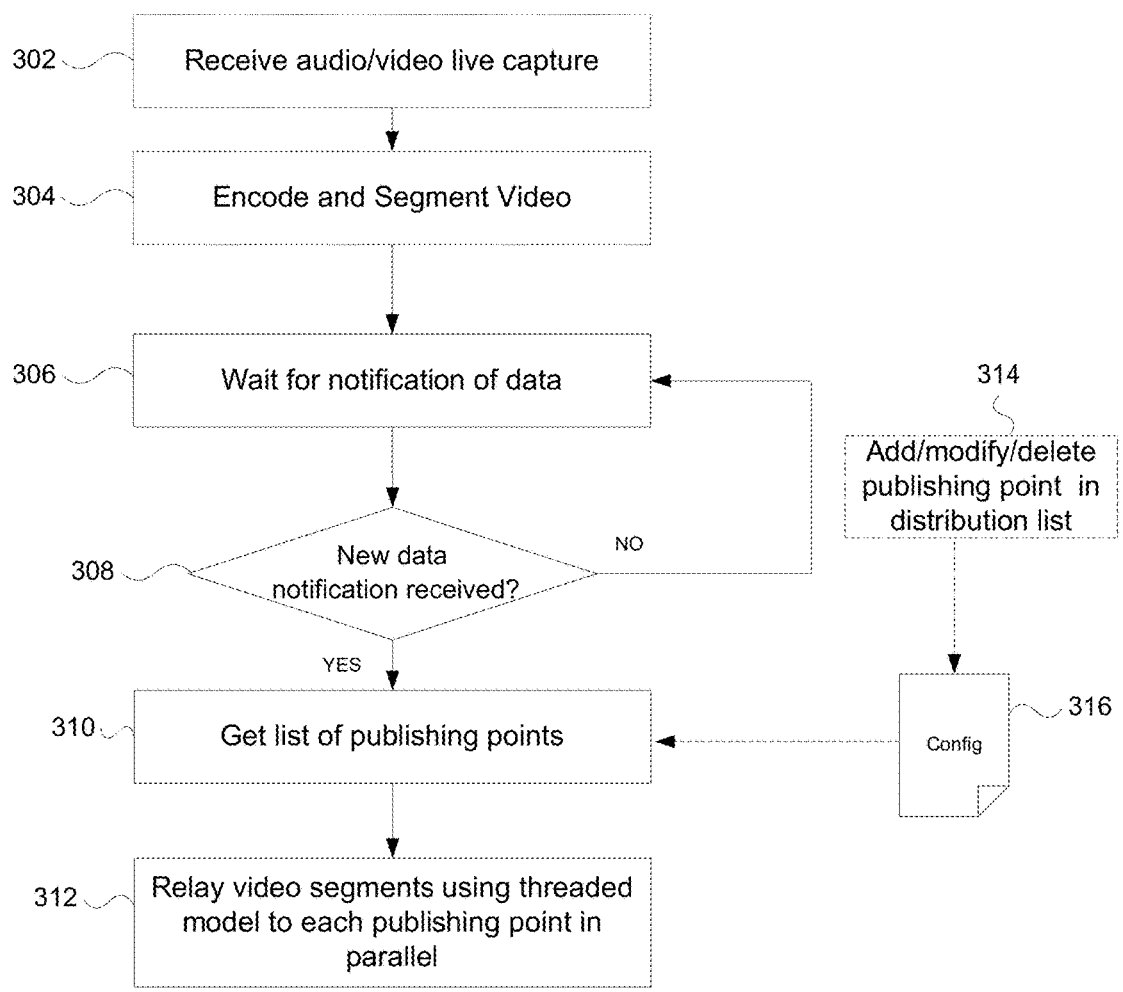
FIG. 3 depicts an illustrative method for distributing live streaming videos over a network.

FIG. 3 depicts an illustrative method for distributing videos over a network. The method 300 begins with receiving data of an audio/video stream (302). The audio/video stream data may be received at an HTTP ABR encoding device. The audio/video may be received from a live event, such as a sporting event, news cast or other event being recorded or broadcast. Additionally or alternatively, the audio/video could be received from a previously recorded event or other audio/video data. Once a portion of the audio/video stream sufficient to encode has been received, the encoding and segmentation process begins (304). The encoding may encode or transcode the audio/video data depending upon the input format of the audio/video and the desired output format. Further the encoding may encode the audio/video data into one or more different bit-rate encodings. For example, the encoding may produce a high bit-rate encoding, a medium bit-rate encoding and a low bit-rate encoding. Each of the bit-rate encodings are segmented into small files each of the same length of time of the audio/video. As the audio/video data is being encoded and segmented the method waits for a notification that data is available (306). The publishing point relay waits for the notification of data, which indicates that new data is available. The method 300 determines if a new data notification has been received (308) and if it hasn't (No at 308) the method continues to wait for a data notification at 306. The new data notification may be received in various ways. For example, if the encoded individual files are retrieved from an NFS drive, then the NFS drive may provide the notification when the new file is written. If the files are transferred using HTTP, an HTTP program or service may provide the notification that a new file has been received. If a new data notification is received (Yes at 308), a list of edge publishing points is retrieved (310). The list of publishing points may be retrieved from a configuration file (316) as depicted or by some other method. Independent of encoding and transferring of data, the edge publishing points may be added to or removed from the configuration file (314). Once the edge publishing points that are registered to receive the audio/video, the method transfers the encoded and segmented video files to each of the edge publishing points (312). The video files may be transferred to each of the edge publishing points using HTTP. Further, separate processes may be used to transfer the files to the respective edge publishing points in parallel. Once received at the edge publishing points, the encoded and segmented video can be served to a plurality of requesting devices, allowing near real-time video streaming to a plurality of devices.

Figure 4:
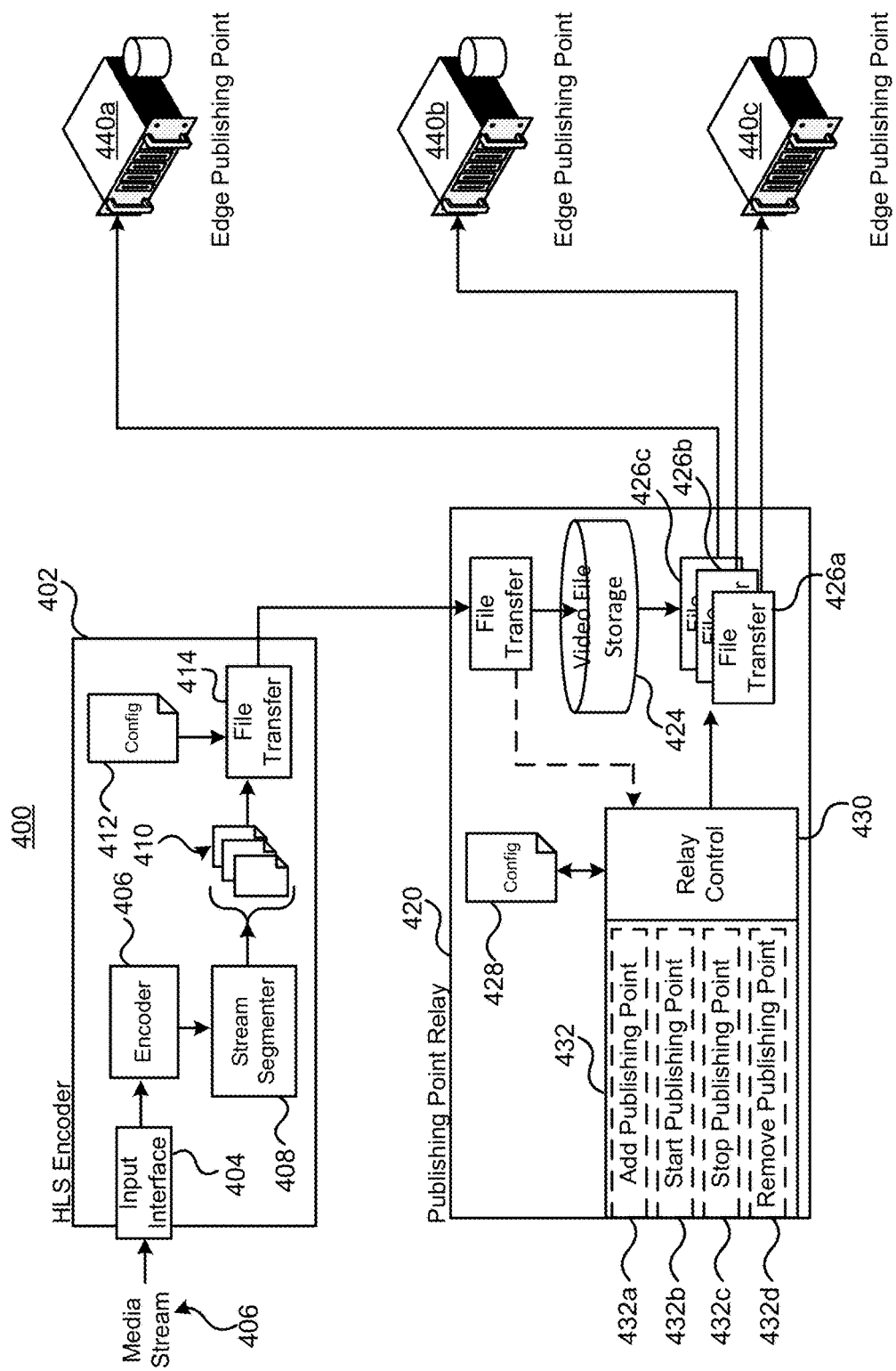
FIG. 4 depicts illustrative components of a system for distributing live streaming videos over a network.

FIG. 4 depicts illustrative components of a system for distributing videos over a network. The system 400 comprises an encoding device 402, a publishing point relay 420, and a plurality of edge publishing points 440a, 440b, 440c (referred to collectively as edge publishing points 440). The encoding device 402, publishing point relay 420 and edge publishing points 440 are connected together through one or more networks, and communicate the encoded files to the edge publishing points in near-time as they are encoded. The edge publishing points 440 can receive and respond to requests for individual files transferred from the encoding device 402.

The encoding device 402 has an input interface 404 for receiving a media stream 406. The input interface 404 receives the media stream and provides it to an encoder 408. The encoder may generate one or more bit-rates from the received media stream, which are segmented into a plurality of files 410 by a stream segmenter 412. As the segmented files 410 are generated, a file transfer component 414 can transfer the files to a set of publishing point relay servers according to a configuration file 416. The files are transferred to the publishing point relay automatically when the files 410 are generated.

The publishing point relay 420 includes a file transfer component 422 that receives the individual files 410 as they are generated and transferred from the encoding device 402. The received files may be temporarily stored in a storage device 424, which may be local or remote to the publishing the publishing point relay 420. The file transfer component 422 may notify a relay control 430 of when new files or notifications of the availability of new files are received. An indication may be provided by the encoding device when new files are available at the network storage location or can be retreived from a network storage location. When new files are available, the relay control determines which edge publishing points 440 the files should be transferred to and transfers the files to the edge publishing points. The individual files can be transferred to each of the edge publishing points 440 in parallel using separate file transfer threads 426a, 426b, 426c. The edge publishing points 440 that the files are transferred to may be retrieved from a configuration file 428 or other list or storage structure. The relay control 430 may include an interface 432 that provides various functionality for controlling which edge publishing points the files are transferred to. For example, the interface may include functionality for adding an edge publishing point to the configuration list 432a, starting a publishing point 432b so that it will begin receiving the files, stopping the publishing point 432c so that it does not receive individual files, and removing the publishing point from the configuration list 432d. If an edge publishing point is temporarily shut down, the publishing point relay need not be notified that the edge publishing point is offline. As such, the publishing point relay may continue to transmit the video files to the edge publishing point, although they won't be received as the edge publishing point is offline. When the edge publishing point is restarted, it will once again begin receiving the video files that the publishing point relay has continued to transmit. If it is deemed undesirable to have the publishing point relay to transmit video files to an edge publishing point that is not responding, then each non-responsive edge publishing point may be removed from the list of edge publishing points to transmit the video files to.

Figure 5:
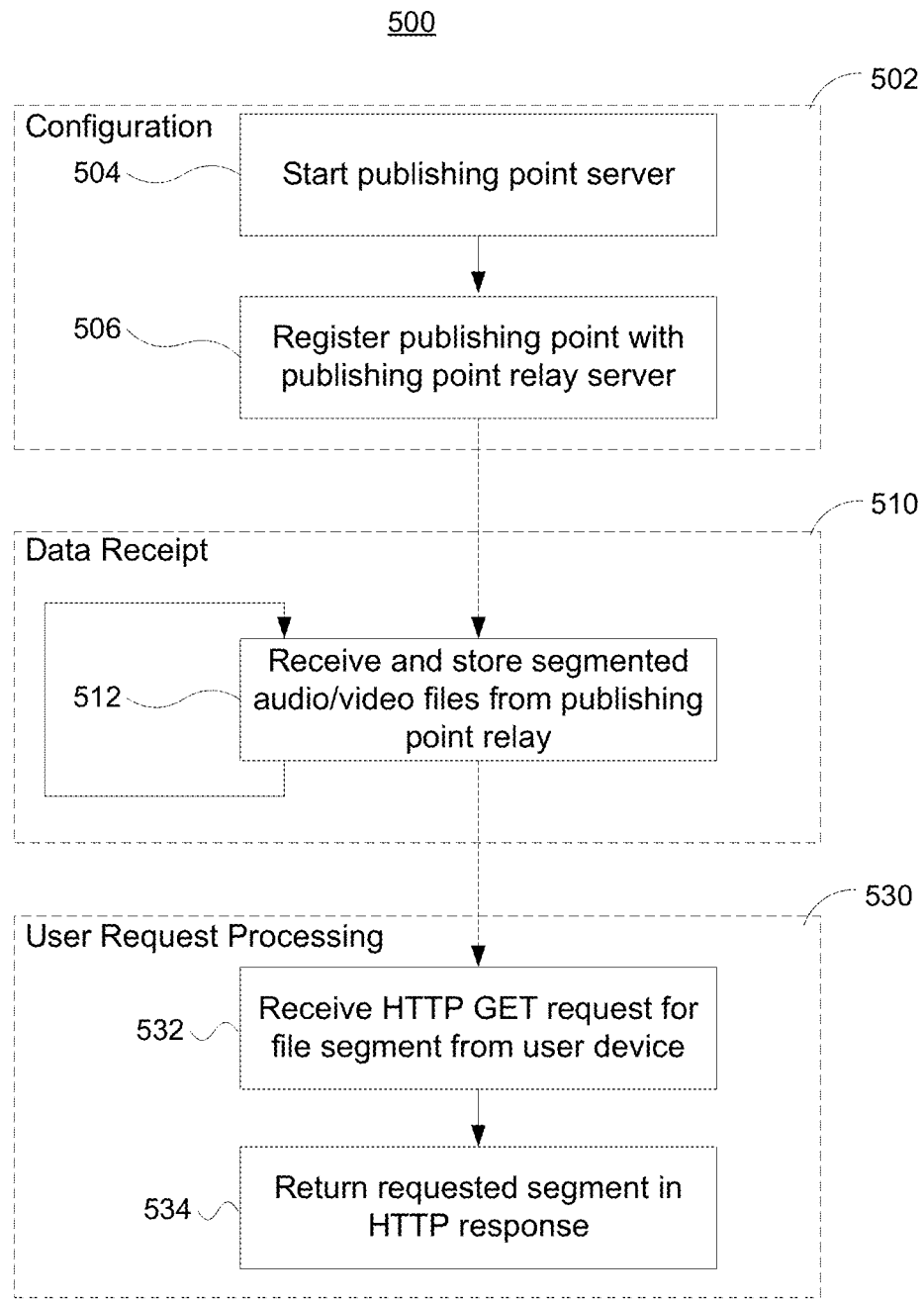
FIG. 5 depicts an illustrative method of distributing live streaming videos over a network.

FIG. 5 depicts an illustrative method of distributing videos over a network. The method 500 depicts the steps required for streaming video from an edge publishing point in accordance with the current disclosure. As depicted, the method 500 comprises three different blocks, namely a configuration block 502, a data reception block 510 and a user request processing block 530. Although the blocks 502, 510 and 530 are depicted as being connected together in a sequential manner, it is contemplated that the different blocks, and in particular the data reception block 510 and the user request processing block 530 may be performed in parallel, that is the method may receive data while at the same time process user requests.

The method 500 begins with configuring the edge publishing point 502 when the edge publishing point is started (504). The edge publishing point must also be configured as a destination by specifying an IP address and port number within the publishing point publishing point relay (506). The publishing point relay uses the address information to transfer the video files to the edge publishing point.

Once the edge publishing point has been configured and started within the publishing point relay, it may begin to receive the relayed publishing point files. The edge publishing point receives and stores segmented audio/video files from the publishing point relay (512). once the minimum number of segmented video files necessary for viewing have been received, users may play the "live feed" from the edge publishing point using an HTTP GET request generated by a client device. Once the request is received, the requested file segment can be retrieved and returned to the requesting device (534). From the above description, it is clear that it is possible to encode and stream a video in near real-time to a large number of user devices while only requiring a small number of encoders. The encoder transfers the encoded and segmented files to a relay that automatically transfers the video segment files to one or more, typically a plurality, of edge publishing points. The edge publishing points may then respond to user HTTP requests as they are received in a scalable manner.

Each element in the embodiments of the present disclosure may be implemented as hardware, software/program in a carrier, or any combination thereof. Software codes, either in its entirety or a part thereof, may be stored in a computer readable medium (e.g., as a ROM, for example a CD ROM or a semiconductor ROM, or a magnetic recording medium, for example a floppy disc or hard disk). The program may be in the form of source code, object code, a code intermediate source and object code such as partially compiled form, or in any other form. A computer data signal representing the software code which may be embedded in a carrier wave may be transmitted via a communication network. The carrier may be any entity or device capable of carrying the program. Further the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

What is claimed is:

1. A system for distributing a video stream, the system comprising:
  a Hypertext Transfer Protocol (HTTP) Adaptive Bit Rate (ABR) video encoding device which:
    receives a portion of the live video stream from a content source;
    encodes the received portion of the video stream into a plurality of encoded video files, each of the encoded video files having associated with a different bit rate stream; and
    makes each of the plurality of encoded video files available to one or more networked devices using a protocol for transferring files over a network;
  a publishing point relay to which:
    receives each of the plurality of the encoded video files from the ABR video encoding device and which are accessible to the publishing point relay from a network storage location wherein a sliding window of video files is maintained by deleting older video files from the publishing point relay and each edge publishing point as new video files are received at the network storage location;
    determines edge publishing points to transfer the encoded video files to, from the publishing point relay, from a list of one or more edge publishing points registered with the publishing point relay wherein the list of edge publishing points can be dynamically updated by removing an edge publishing point from the list when the edge publishing point is non-responsive; and
    transfers each of the encoded video files received by the publishing point relay to each of the determined edge publishing points as each file is received from the video ABR encoding device; and
  a plurality of edge publishing points, each:
    receives and store the encoded video files transferred from the publishing point relay;
    receives HTTP GET requests for one of the stored encoded video file from HTTP clients; and
    transfers the requested encoded video files via HTTP GET responses to the requesting HTTP clients;
    wherein the ABR video encoding device writes the video files to the network storage location, and wherein the publishing point relay receives each of the plurality of the encoded video files by receiving an indication that the individual video files are available at the network storage location and retrieves the video files from the network storage location.

2. The system of claim 1, wherein the publishing point relay dynamically updates the list of the plurality of edge publishing points registered with the publishing point relay without any service affecting down time.

3. The system of claim 1, wherein the publishing point relay receives a file transfer protocol address of an edge publishing point to be registered with the relay and updates the list of the plurality of registered edge publishing points to include the received file transfer protocol address.

4. The system of claim 1, wherein the publishing point relay receives an identification of one of the plurality of edge publishing points registered with the publishing point relay and removes the identified edge publishing point from the plurality of publishing point registered with the publishing point relay to receive the encoded video files.

5. The system of claim 1, further comprising a second publishing point relay, wherein the ABR encoding device transfers each of the encoded video files to both the publishing point relay and the second publishing point relay.

6. The system of claim 5, wherein the second publishing point relay provides fail-over capabilities to the publishing point relay.

7. The system of claim 1, wherein each of the plurality of video files encoded from the portion of the video stream encode the same length time of the video stream into separate files each having different bit-rates.

8. The system of claim 1, wherein the ABR video encoding device writes the video files to one or more drives, and wherein the publishing point relay receives each of the plurality of the encoded video files by receiving an indication that the individual video files are available and retrieves the video files.

9. The system of claim 1, wherein at least one of the edge publishing points stores a copy of each of the received video files to provide a live capture of the video stream for later nPVR play outs to provide "Catch Up TV" and similar enhanced services.

10. A method of distributing a video stream comprising:
  receiving, at a publishing point relay, a plurality of video files encoded from a portion of the video stream from a Hypertext Transfer Protocol (HTTP) Adaptive Bit Rate (ABR) video encoding device and which are accessible to the publishing point relay from a network storage location wherein a sliding window of video files is maintained by deleting older video files from the publishing point relay and each edge publishing point as new video files are received at the network storage location, each of the encoded video files having a different bit-rate;
  determining edge publishing point servers from a list of one or more edge publishing points registered with the publishing point relay to distribute an audio/video stream wherein the list of edge publishing points can be dynamically updated by removing an edge publishing point from the list when the edge publishing point is non-responsive;
  relaying each of the encoded video files received by the publishing point relay to each of the determined edge publishing points as each video file is received from the ABR encoding device; and
  providing a plurality of edge publishing points, wherein each:
    receives and store stores the encoded video files transferred from the publishing point relay;
    receives HTTP GET requests for one of the stored encoded video files from HTTP clients; and
    transfers the requested encoded video files via HTTP GET responses to the requesting HTTP clients;
  wherein receiving, at the publishing point relay, the plurality of video files comprises:
    receiving at the publishing point relay, for each of the plurality of video files, a respective indication that the video file has been written to the network storage location; and
    retrieving, by the publishing point relay, each of the video files from the network storage location.

11. The method of claim 10, further comprising maintaining at the publishing point relay the list of edge publishing points to transfer the encoded video files to.

12. The method of claim 10, wherein maintaining the list of edge publishing points comprises:
receiving an IP address and port of an edge publishing point to be registered with the publishing point relay; and
updating the list of the plurality of registered edge publishing points to include the new edge publishing point.

13. The method of claim 10, wherein maintaining the list of edge publishing points further comprises:
receiving an identification of one of the edge publishing points of the plurality of edge publishing points registered with the publishing point relay; and
removing the identified edge publishing point from the plurality of edge publishing points registered with the publishing point relay.

14. The method of claim 10, wherein receiving, at the publishing point relay, the plurality of video files comprises:
receiving, for each of the plurality of video files, a respective indication that the video file has been written to a drive; and
retrieving each of the video files from the drive.

15. The method of claim 10, further comprising:
receiving a portion of the video stream from a content source by an ABR video encoding device;
encoding the received portion of the video stream into the plurality of encoded video files, each of the encoded video files having different bit rates; and
making each of the plurality of encoded video files available to the publishing point relay.

16. The method of claim 10, registering at least one of the edge publishing points with the publishing point relay to receive the encoded video files.

17. The method of claim 10, further comprising transferring each of the encoded video files to both the publishing point relay and a second publishing point relay.

18. The method of claim 10, wherein the ABR video encoding device writes the video files to one or more drives, and wherein the publishing point relay receives each of the plurality of the encoded video files by receiving an indication that the individual video files are available and retrieves the video files.

19. An apparatus for use in streaming video, the apparatus comprising:
a processor for executing instruction; and
a memory for storing instructions, the instructions when executed by the processor configuring the apparatus to:
receive each of a plurality of encoded video files from a Hypertext Transfer Protocol (HTTP) Adaptive Bit Rate (ABR) video encoding device and which are accessible to the publishing point relay from a network storage location wherein a sliding window of video files is maintained by deleting older video files from the publishing point relay and each edge publishing point as new video files are received at the network storage location;
determine edge publishing points to transfer the encoded video files to, from the publishing point relay, from a list of one or more edge publishing points registered with the publishing point relay wherein the list of edge publishing points can be dynamically updated by removing an edge publishing point from the list when the edge publishing point is non-responsive; and
transfer each of the encoded video files received by the publishing point relay to each of the determined edge publishing points as each file is received from the ABR encoding device
a plurality of edge publishing points, wherein each:
receives and store stores the encoded video files transferred from the publishing point relay;
receives HTTP GET requests for one of the stored encoded video files from HTTP clients; and
transfers the requested encoded video files via HTTP GET responses to the requesting HTTP clients;
wherein the ABR video encoding device writes the video files to the network storage location, and wherein the publishing point relay receives each of the plurality of the encoded video files by receiving an indication that the individual video files are available at the network storage location and retrieves the video files from the network storage location.

20. The apparatus of claim 19, wherein the publishing point relay further receives an identification of one of the plurality of edge publishing points registered with the publishing point relay and removes the identified publishing point from the plurality of publishing point registered with the publishing point relay to receive the encoded video files.

21. The apparatus of claim 19, wherein each of the plurality of the received video files encode the same length time of the video stream into separate files each having different bitrates.

22. The apparatus of claim 19, wherein a protocol for transferring files over a network used by ABR encoding device to make the video files available is a network file system (NFS) protocol, wherein the ABR video encoding device writes the video files to one or more drives, and wherein the publishing point relay receives each of the plurality of the encoded video files by receiving an indication that the individual video files are available and retrieves the video files.

* * * * *